United States Patent [19]

England et al.

[11] Patent Number: 5,299,113
[45] Date of Patent: Mar. 29, 1994

[54] CONTROL BOARD HAVING DUAL MEANS OF CONFIGURATION

[75] Inventors: Brent A. England; Scott A. Merkle, both of Newton, Iowa

[73] Assignee: Maytag Corporation, Newton, Iowa

[21] Appl. No.: 872,623

[22] Filed: Apr. 22, 1992

[51] Int. Cl.$^5$ ............... G06F 15/46; G05B 15/02
[52] U.S. Cl. ................... 364/140; 364/146; 364/189
[58] Field of Search ............ 364/131, 146, 140, 184, 364/188, 189, 138; 340/825.06; 455/352, 353

[56] References Cited

U.S. PATENT DOCUMENTS

| | | | |
|---|---|---|---|
| 3,112,378 | 11/1963 | Holzer | 200/33 |
| 4,001,599 | 1/1977 | Karklys | 307/141 |
| 4,084,237 | 4/1978 | Beachem et al. | 364/400 |
| 4,109,775 | 8/1978 | Hayashi | 194/10 |
| 4,119,948 | 10/1978 | Ward et al. | 340/151 |
| 4,146,778 | 3/1979 | Wain | 235/92 AC |
| 4,184,347 | 1/1980 | Tobita et al. | 364/144 |
| 4,203,014 | 5/1980 | Harris | 200/38 R |
| 4,216,461 | 8/1980 | Werth et al. | 340/149 R |
| 4,231,105 | 10/1980 | Schuller et al. | 364/900 |
| 4,306,219 | 12/1981 | Main et al. | 340/825.54 |
| 4,316,532 | 2/1982 | Levasseur | 194/1 N |
| 4,328,539 | 5/1982 | Heeger | 364/144 |
| 4,366,481 | 12/1982 | Main et al. | 340/825.54 |
| 4,369,442 | 1/1983 | Werth et al. | 340/825.35 |
| 4,409,649 | 10/1983 | Heeger | 364/144 |
| 4,417,450 | 11/1983 | Morgan, Jr. et al. | 62/126 |
| 4,463,446 | 7/1984 | Shah et al. | 364/900 |
| 4,512,453 | 4/1985 | Schuller et al. | 194/1 N |
| 4,520,451 | 5/1985 | McLaughlin | 364/900 |
| 4,598,378 | 7/1986 | Giacomo | 364/479 |
| 4,642,753 | 2/1987 | Easthill | 364/184 |
| 4,706,794 | 11/1987 | Awane et al. | 194/217 |
| 4,760,547 | 7/1988 | Duxbury | 364/420 |
| 4,828,097 | 5/1989 | Kresta et al. | 194/227 |
| 4,844,229 | 7/1989 | Friedman et al. | 194/226 |
| 4,845,484 | 7/1989 | Ellsberg | 340/825.35 |
| 4,907,250 | 3/1990 | Ricks | 377/7 |
| 4,973,957 | 11/1990 | Shimizu et al. | 340/825.520 |
| 4,999,763 | 3/1991 | Ousborne | 364/140 |
| 5,055,996 | 10/1991 | Keslowitz | 364/188 |
| 5,086,385 | 2/1992 | Launey et al. | 364/188 |

OTHER PUBLICATIONS

"A DDCMP based Communications Protocol for the Vending Industry Data Transfer Standard," International Edition, Version 2, Feb. 1, 1992, pp. 5.i through 5.38 from a manual entitled *The Vending Industry Data Standard* produced for distribution to the members of the National Automatic Merchandising Association.

"Low Speed Optical Comms Link for the Vending Industry Data Transfer Standard," American Edition, Appendix A Draft 1, Jun. 12, 1990, pp. 5.Ai through 5.A8 from a manual entitled *The Vending Industry Data Standard* produced for distribution to the members of the National Automatic Merchandising Association.

Wick, J., "A Question and Answer Guide to Electronic Audit Systems," 1992. The Greenwick Company Inc. of Parkesburg, Pa., 20 pages plus an Audit Product Comparison Checklist (2 pages).

DDCMP, Version 4.0, Mar. 1, 1978.

W. Stallings, "Data and Computer Communications," pp. 105–110 (MacMillan Publishing Co. 1985).

*Primary Examiner*—Jerry Smith
*Assistant Examiner*—Paul Gordon
*Attorney, Agent, or Firm*—Willian Brinks Hofer Gilson & Lione

[57] ABSTRACT

An apparatus and system for permitting dual-mode configuration of an appliance control board preferably in conjunction with an external electronic programming device or by means internal to the appliance. Preferably, a set of selection switches are provided in an interior space of the appliance that are used to select desired operating parameters. By changing the setting of the switches, the operator may configure the appliance for many specific modes of operation. In addition, the appliance can be electronically reconfigured by use of a hand held data probe.

17 Claims, 11 Drawing Sheets

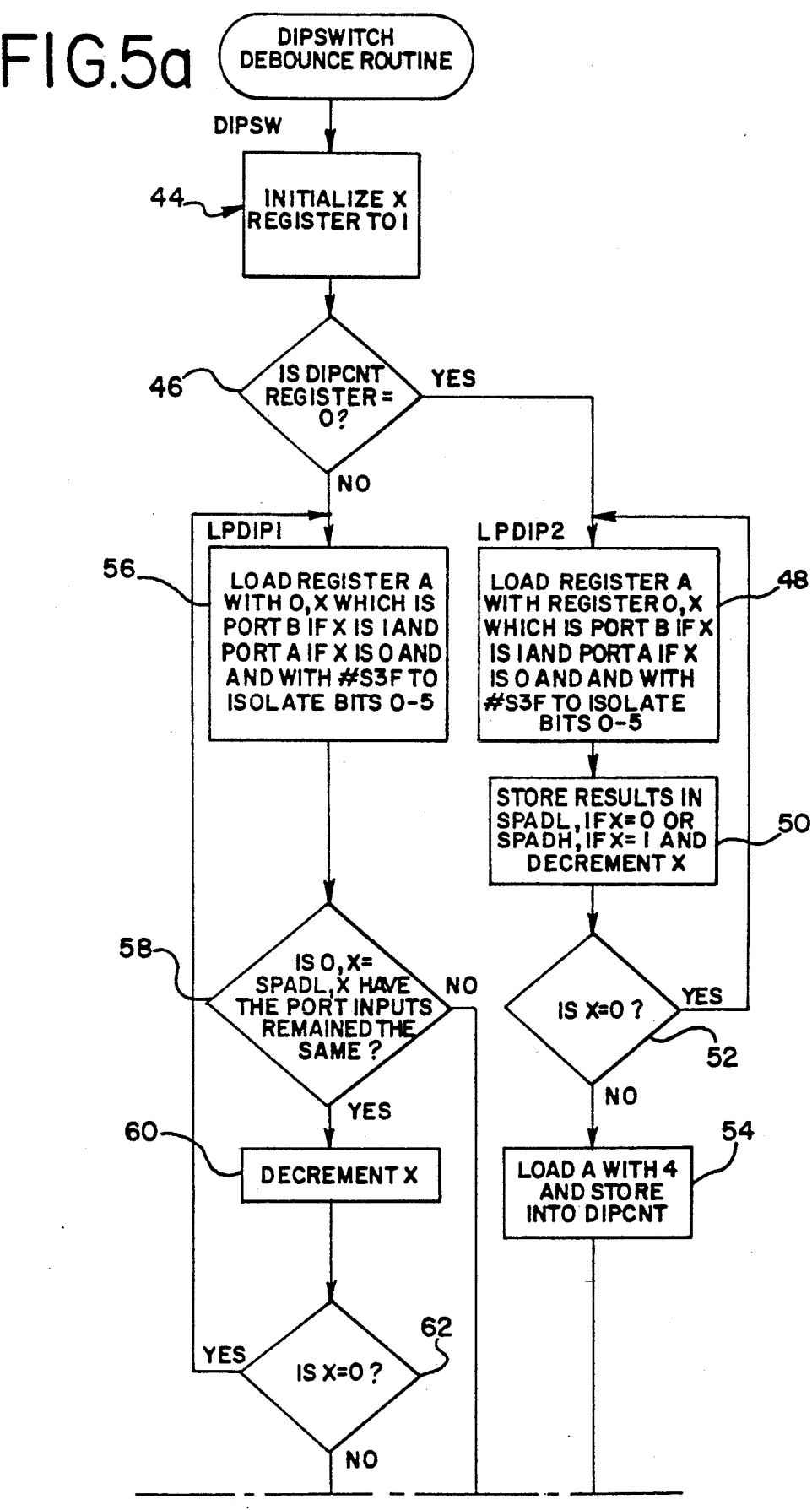

FIG. 6

| SWITCH SETTING | | # OF COIN "1" PER CYCLE |
|---|---|---|
| 12345 | 67 8 9 10 11 12 | |
| 00000 | XX X X X  X X | DEFAULT |
| 00001 | XX X X X  X X | 1 |
| 00010 | XX X X X  X X | 2 |
| 00011 | XX X X X  X X | 3 |
| 00100 | XX X X X  X X | 4 |
| 00101 | XX X X X  X X | 5 |
| 00110 | XX X X X  X X | 6 |
| 00111 | XX X X X  X X | 7 |
| 01000 | XX X X X  X X | 8 |
| 01001 | XX X X X  X X | 9 |
| 01010 | XX X X X  X X | 10 |
| 01011 | XX X X X  X X | 11 |
| 01100 | XX X X X  X X | 12 |
| 01101 | XX X X X  X X | 13 |
| 01110 | XX X X X  X X | 14 |
| 01111 | XX X X X  X X | 15 |
| 10000 | XX X X X  X X | 16 |
| 10001 | XX X X X  X X | 17 |
| 10010 | XX X X X  X X | 18 |
| 10011 | XX X X X  X X | 19 |
| 10100 | XX X X X  X X | 20 |
| 10101 | XX X X X  X X | 21 |
| 10110 | XX X X X  X X | 22 |
| 10111 | XX X X X  X X | 23 |
| 11000 | XX X X X  X X | 24 |
| 11001 | XX X X X  X X | 25 |
| 11010 | XX X X X  X X | 26 |
| 11011 | XX X X X  X X | 27 |
| 11100 | XX X X X  X X | 28 |
| 11101 | XX X X X  X X | 29 |
| 11110 | XX X X X  X X | 30 |
| 11111 | XX X X X  X X | FREE |

FIG. 7

| SWITCH SETTING        | "2"/"1"     | VALUE COIN | VALUE COIN |
| 12345 67 8 9 10 11 12 | VALUE RATIO | "1"        | "2"        |
|-----------------------|-------------|------------|------------|
| XXXXX 00 X X X X X    | 2           | $1.00      | $2.00      |
| XXXXX 01 X X X X X    | 2.5         | $0.10      | $0.25      |
| XXXXX 10 X X X X X    | 4           | $0.25      | $1.00      |
| XXXXX 11 X X X X X    | 5           | $0.20      | $1.00      |

| SWITCH SETTING        |                   |
| 12345 67 8 9 10 11 12 | DRYER FIXED CYCLE |
|-----------------------|-------------------|
| XXXXX XX 0 X X X X    | NO                |
| XXXXX XX 1 X X X X    | YES               |

| SWITCH SETTING        | DRYER CYCLE |
| 12345 67 8 9 10 11 12 | MINUTES     |
|-----------------------|-------------|
| XXXXX XX X 0 0 0 0    | 5           |
| XXXXX XX X 0 0 0 1    | 10          |
| XXXXX XX X 0 0 1 0    | 15          |
| XXXXX XX X 0 0 1 1    | 20          |
| XXXXX XX X 0 1 0 0    | 25          |
| XXXXX XX X 0 1 0 1    | 30          |
| XXXXX XX X 0 1 1 0    | 35          |
| XXXXX XX X 0 1 1 1    | 40          |
| XXXXX XX X 1 0 0 0    | 45          |
| XXXXX XX X 1 0 0 1    | 50          |
| XXXXX XX X 1 0 1 0    | 55          |
| XXXXX XX X 1 0 1 1    | 60          |
| XXXXX XX X 1 1 0 0    | 65          |
| XXXXX XX X 1 1 0 1    | 70          |
| XXXXX XX X 1 1 1 0    | 75          |
| XXXXX XX X 1 1 1 1    | 80          |

84

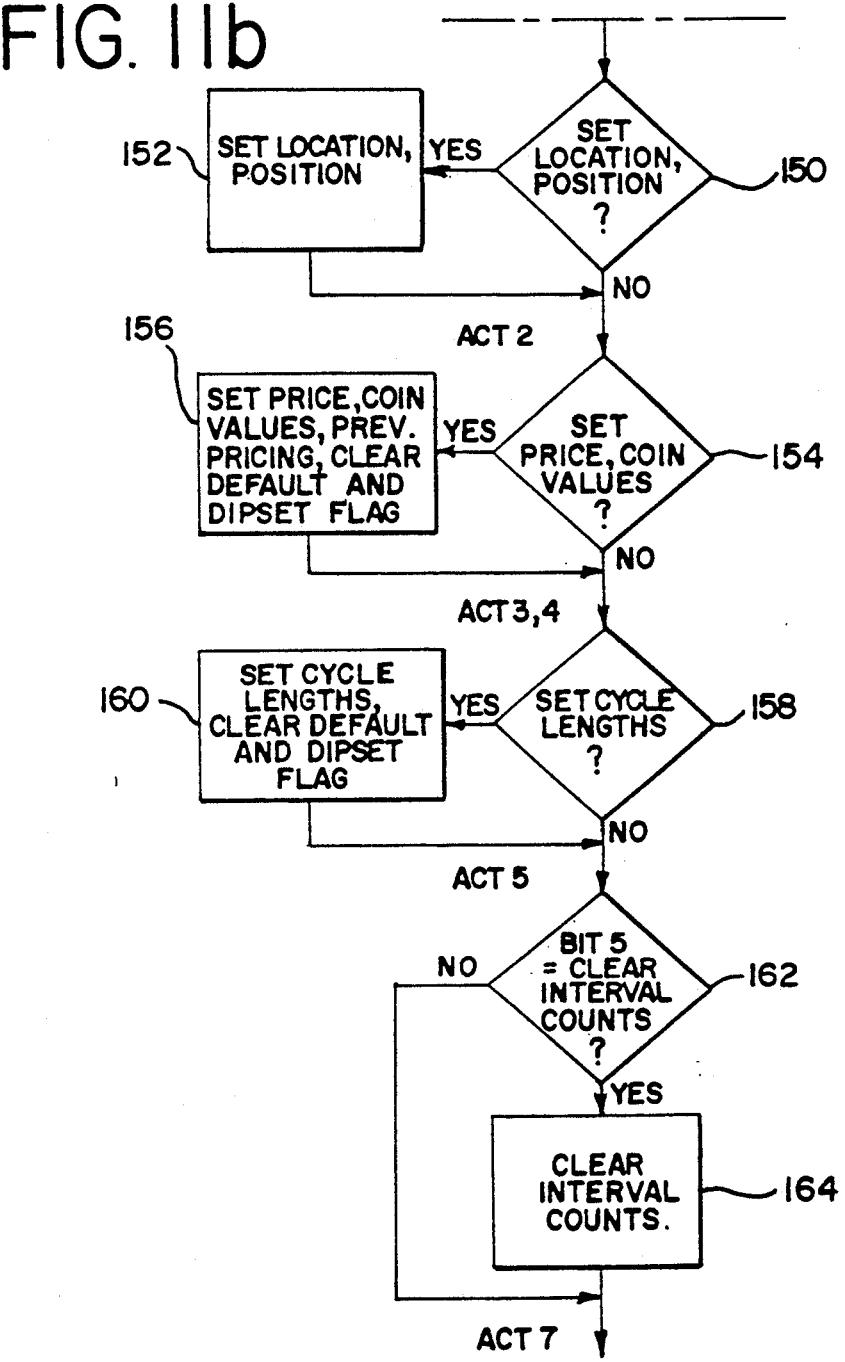

CONTROL BOARD HAVING DUAL MEANS OF CONFIGURATION

REFERENCE TO RELATED APPLICATIONS

The disclosures of the following copending applications assigned to the assignee of the present application and filed concurrently herewith are specifically incorporated by reference:

"Data Acquisition System Having Setup Duplication Capability," by Brent A. England, U.S. patent application Ser. No. 07/872,914, filed on Apr. 22, 1992; and "Data Acquisition System Having Selective Communication Capability," by Scott A. Merkle and Douglas A. Ochsner, U.S. patent application Ser. No. 07/872,062 filed on Apr. 22, 1991.

BACKGROUND OF THE INVENTION

1. Field of the Invention

The present invention is directed to the field of control board configuration, and in particular, to an appliance control board utilizing dual means of configuration, preferably in conjunction with an external electronic programming device or in normal manners without the use of an external device.

2. Description of the Prior Art

In the commercial laundry field it is desirable to provide laundry appliances, such as washers and dryers, with owner selectable features. For example, a laundromat owner or route operator may wish to configure one or more appliances to provide a selected cycle length for a selected price. Different owners may wish to configure similar appliances to provide different operation, such as cycle length, at different prices, or to modify previously-selected parameters in response to changing market or competitive conditions, for example.

For these reasons, manufacturers of such appliances often provide ways in which the appliance can be configured or reconfigured as desired. For example, the coin receiving mechanisms typically utilized in conjunction with vending machines including commercial laundry appliances permit the owner to select a desired vend price from a range of available prices. Many techniques are known for providing such selectable pricing, including techniques for mechanically adjusting an electro-mechanical coin mechanism or counter. Mechanical means such as mechanical three-way adjustable price setters and linkage to quickly change the coin control mechanism among any one of three preset prices are described in U.S. Pat. Nos. 4,828,097 (Kresta et al.) and 4,844,229 (Friedman et al.). A vender having a plurality of switches which can easily preset the vend price by suitably opening and closing these switches is described in U.S. Pat. No. 4,109,775 (Hayashi). Electronic means utilizing selection switches which are also used for sale purposes to store data in a microcomputer vending machine are described in U.S. Pat. Nos. 4,316,532 (Levasseur) and 4,706,794 (Awane et al.). An appliance programmer integrated circuit having a basic program of operation which may be modified two ways is described in U.S. Pat. No. 4,001,599 (Karklys). The basic program may be automatically altered by a program change command circuit which is incorporated in the programmer circuit and which scans certain terminals of the circuit to determine the particular program application. The operator is provided with switches for selectively altering the basic program.

Similar adjustments have been provided for certain of the mechanical operations of an appliance. For example, electronic and electro-mechanical timers have been used in conjunction with washers and dryers in a commercial laundry environment wherein user-selectable timing intervals are provided. For example, U.S. Pat. No. 4,203,014 (Harris) describes a mechanically adjustable interval cycle timer. Rotation of a setting shaft changes the angular position of a stop lug which in turn controls the starting position of a lug which in turn controls the starting position of a lug or reset gear. U.S. Pat. No. 3,112,378 (Holzer) describes a mechanical device for changing the program of washing machines by using switching means controlled by a keyplate.

State-of-the-art commercial laundry appliances today further incorporate data accumulation and communication capabilities. For example, switches or electro-optical detectors may be provided to monitor certain aspects of machine operation, such as monies deposited, cycles vended, certain door openings, power failures and other useful information. These data may be retained in electronic memory within the appliance and subsequently communicated to a portable collection unit, such as a hand held probe or computer. Systems of this type are described, for example, in U.S. Pat. Nos. 4,369,442 (Werth et al.); 4,216,461 (Werth et al.) and 4,306,219 (Main et al.). In such a system, the laundry appliance is provided with an appropriate means for establishing communication with an external device, such as an infrared optical communication link.

It is known to utilize electronic means for configuring the operating parameters of a vending machine. For example, U.S. Pat. No. 4,328,539 (Heeger) describes a sequence controller utilizing a microprocessor to control timing and other sequence information in connection with a vending machine. The specific timing parameters are alterable electronically by means of a service module which may be coupled to the vending machine to alter certain memory code corresponding to sequence timing and other aspects of the machine operation, as desired. Thus, the vending machine is flexibly reconfigurable for various modes operation, utilizing a detachable electronic module.

The prior approaches for permitting a user to selectably configure an appliance as described above have many limitations. Many appliances require access by the user to the interior of the appliance to make the necessary adjustments or to set the corresponding switch selectors in the desired location. Anyone having access to the interior of the machine is therefore capable of adjusting these settings, which presents opportunities for error or fraud. It is highly desirable, therefore, to provide a configurable appliance which also provides protection against error or fraud. The vending machine of Heeger requires a specialized electronic service module in order for the owner to make adjustments in operation of the vending machine thereby adding expense and presenting difficulties if the programming module is unavailable.

It is desirable to provide commercial laundry appliances which may be used in conjunction with external electronic programming devices, such as a hand held data probe, or in the normal manners without use of any external devices. Such flexibility permits the owner or route operator to purchase appliances for use in substantially standard manners, without purchasing portable data devices, yet permits the owner or operator to upgrade in the future by purchasing a hand held data probe and converting to more flexible operation taking full advantage of the capabilities offered by this combination. Unfortunately, none of the prior art devices or methods provide for such a dual-mode flexibility.

In addition, it is desirable to provide commercial laundry appliances having such dual flexibility with the added security of defeating unintended manipulation of the appliance by anyone who has access to the interior of the appliance once a data probe has been used to configure the laundry appliance. In order to reconfigure or alter the configuration of the appliance, a valid programming data probe must be used. Unfortunately, none of the prior art devices or methods provide for such dual-mode flexibility with the added security of preventing unintended manipulation of the appliance.

SUMMARY OF THE INVENTION

A vending machine, such as a commercial laundry appliance, is provided which is uniquely adapted to permit dual-mode use. In particular, means are provided to allow the owner to access a first means for selecting desired operating parameters of the appliance. For example, in a preferred embodiment, a set of selection switches are provided in an interior space of the appliance, accessible only by an authorized user or owner. These switches may be used to select desired operating parameters such as cycle lengths and vend prices. By changing the setting of the switches, the operator may configure the appliance for many specific modes of operation as desired.

Important to the present invention, a second means for effecting machine programming or configuration is also provided. The second means allows for electronic reconfiguration of the appliance without requiring physical access to the interior of the appliance or manipulation of physical elements, such as switches. In a preferred embodiment, data communication via an electro-optical communication path is established with a hand held data probe, and appropriate programming instructions are transmitted by the probe and received by the appliance to modify the programming data retained by the appliance. For example, information pertaining to desired operating parameters may be retained in electronic memory registers, which are modified or updated as appropriate in response to commands received from the external data probe by way of the electro-optical communication link.

The preferred embodiment further provides means for locking out the first means of programming previously described. In particular, the first means for programming may be effective for modifying machine operation only until a first communication transmitting desired configuration or setup information from an external data probe has occurred. Thereafter the appliance will disregard the setting of the first selection means or switches, and instead accept future programming only by means of the electronic or electro-optical communication link.

It is an object of the present invention to provide a mechanical communication in combination with electro-optical communication for configuring various parameters of an appliance.

It is another object of the present invention to provide a lock out feature which may be activated by the electro-optical communication.

Further objects and advantages of this invention will become more apparent and readily appreciated from the following detailed description of the present invention with reference to the accompanying drawings.

BRIEF DESCRIPTION OF THE DRAWINGS

FIGS. 5a and 5b are flow charts illustrating the debounce routine for interrogating a plurality of dip switches.

FIG. 6 illustrates switches associated with the pricing parameter.

FIG. 7 illustrates switches associated with the value ratio parameter.

FIG. 8 illustrates switches associates with the dryer fixed cycle parameter.

FIG. 9 illustrates switches associated with the dryer cycle time parameter.

FIGS. 11a and 11b are flow charts illustrating a portion of the communication protocol between the probe and the data acquisition unit.

DETAILED DESCRIPTION OF THE PRESENTLY PREFERRED EMBODIMENTS

Figure 1:
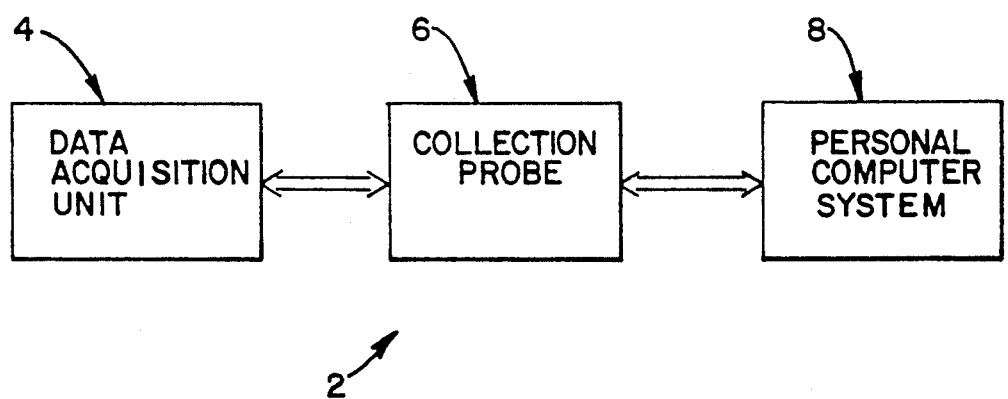
FIG. 1 illustrates a data acquisition system according to the present invention.

FIG. 1 illustrates a data acquisition system 2 according to the present invention. The data acquisition system incorporates three major elements: a data acquisition unit 4 which resides in an appliance such as a washer or dryer and is integral with the appliance's controller; a commercially available collection probe 6 which is carried by a route operator to interface with one or more of the appliances having data collection capability; and a personal computer system 8 for use by the route operator to receive collected information from the collection probe 6 and perform desired business analyses on the information. The present invention is directed to the configuration of the data acquisition unit 4 by means internal to the unit 4 and by means external to the unit in the form of messages, referred to as protocol, exchanged between a data acquisition unit 4 and a collection probe 6.

Figure 2:
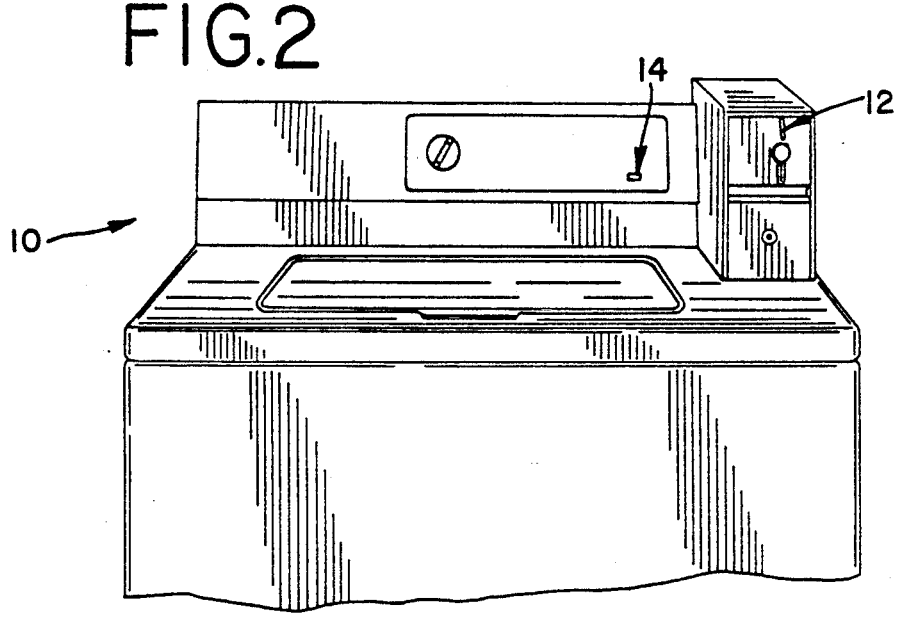
FIG. 2 illustrates an appliance incorporating a data acquisition unit according to a preferred embodiment of the present invention.

FIG. 2 illustrates an appliance such as a washer 10 according to the present invention. The washer 10 is equipped with at least one coin drop slot 12, an optical window 14 behind which is an optical transceiver (not shown) having an optical emitter and an optical detector and a panel (not shown) behind which are a group of switches. The optical window 14 is provided so that the washer 10 can communicate with an external device such as a portable data unit, for example, a hand held probe (see FIG. 3). The panel is located so as to be easily accessible by an owner or route operator. The panel is provided so that the owner or route operator can communicate with the washer 10 by means of the group of switches located in the interior of the appliance and preferably on the control board of the appliance. Preferably the switches are placed behind a limited access panel.

Figure 3:
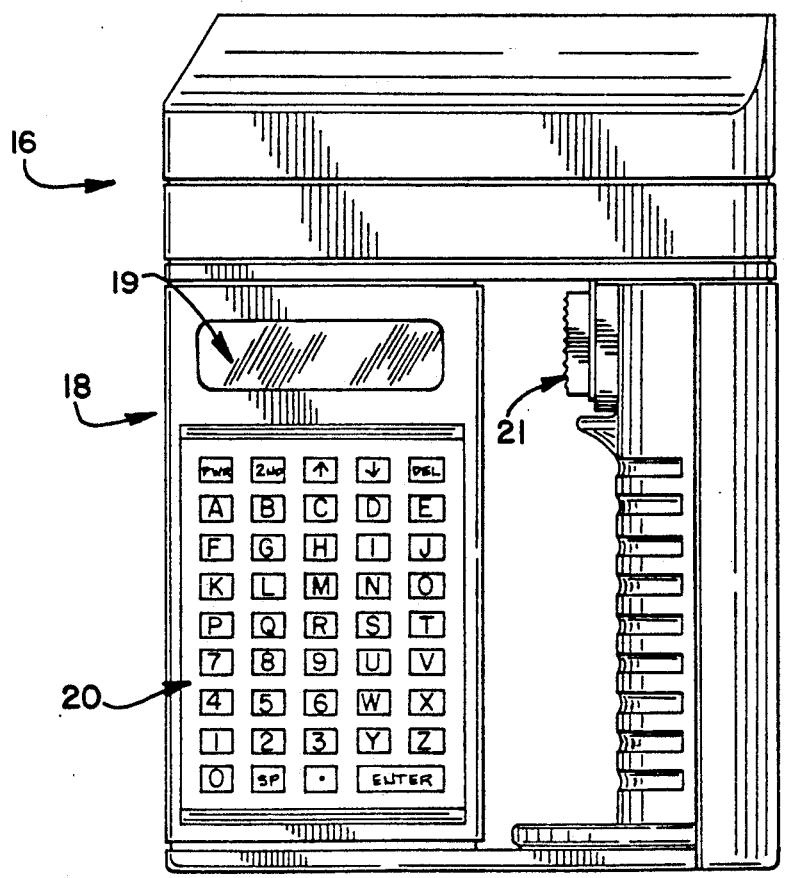
FIG. 3 illustrates a portable probe used in conjunction with the present invention.

FIG. 3 illustrates an external device in the form of a portable probe 16 which may be used in conjunction with the present invention. The probe 16 has an optical communications window 18 located on the side of the probe 16 behind which lies an optical transceiver (not shown) formed by an optical emitter and an optical detector. In addition, a keypad 20 is provided to allow the owner or route operator to select a mode of operation and enter data. A liquid crystal display (LCD) screen 19 displays menus from which the user may select options. A trigger button 21 is used to initiate sending signals to and receiving signals from the optical communication window 14 (FIG. 2) of the washer 10. Preferably the probe 16 employed utilizes infrared communications although other optical wavelengths may be similarly utilized. An infrared probe is available from Mars Electronic Company commercially as the MARS MEQ ™ 130 Portable Data Terminal.

Figure 4:
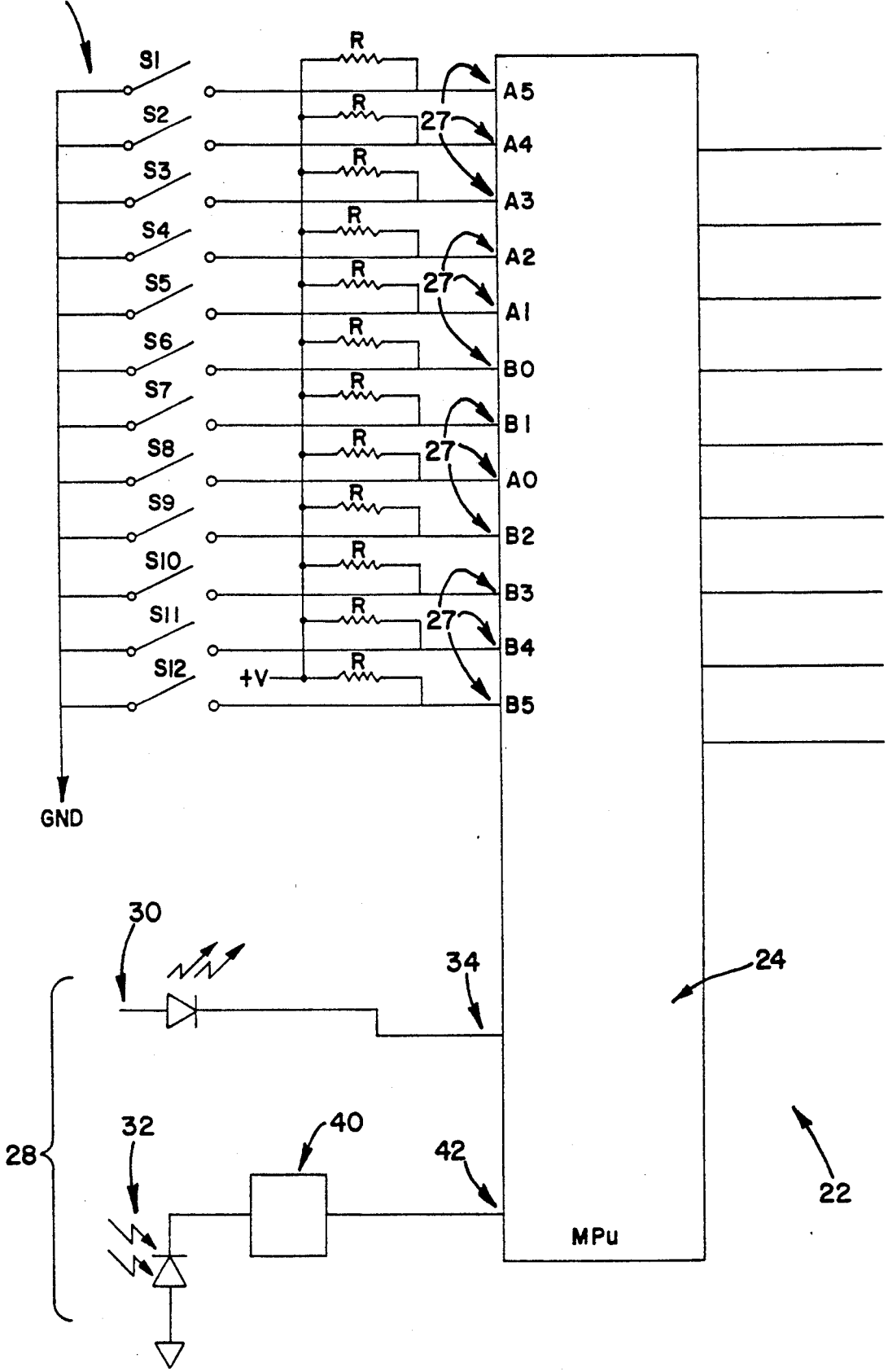
FIG. 4 is an electrical schematic of a portion of the data acquisition unit located on a control board for the appliance shown in FIG. 2.

FIG. 4 is an electrical schematic of a portion of the data acquisition unit located on a control board 22 having dual means of configuration in accordance with the present invention for the appliance shown in FIG. 2.

The control board 22 includes a microprocessor 24, a group of dual inline package (dip) switches 26 and an optical transceiver 28 formed by an optical emitter 30 and an optical detector 32. Preferably the microprocessor 24 is a Hitachi microcomputer, model number HD 6305VO. Many types of switches may be used and preferably a 12 position dip switch, model number 76SB12S available from Grayhill of LaGrange, Ill. is used.

In the present invention, the appliance, a washer, has a relay (not shown) mounted on the control board to power or initiate an electro-mechanical timer. The timer sequences and powers various appliances such as water valves and motors. For other appliances, a plurality of relays may be mounted off the control board and electrically connected with components of the board. The relays are selectively energized for controlling the various functions of the appliance. The specific construction of the apparatus required for the mechanical functions of the appliance are well known to those skilled in the art and form no part of the present invention. For that reason, they will not be described in detail, it being understood that the relays open and close the required electrical circuits for proper operation of the appliance.

The optical transceiver 28 preferably provides two-way communication between the appliance, such as a washer 10 (FIG. 2) and the hand held probe 16 (FIG. 3). The appliance can thus transmit information to the probe 16 via its emitter 30 and receive information from the probe 16 via its detector 32. The probe 16 and the microprocessor 24 have memory means to store information concerning the communications between the units and other information relevant to the operation of the present invention as will be appreciated by those skilled it the art. If the user wants to setup or change the operational parameters of the appliance using the probe 16, the user selects a setup or configuration mode of operation by means of the keypad 20 and sends a setup record to the appliance by pulling the trigger 21. The setup record is preferably created at a remote computer site and downloaded into the memory of the probe 16. The setup record may be created on-site using the keypad 20 of the probe 16, however, this is generally not as convenient.

An output 34 of the microprocessor 24 may be used and controlled by appropriate programming in a manner well known to those of ordinary skill in the art to control the optical emitter 30. The output 34 may be controlled by suitable programming of the microprocessor 24 to generate coded outputs corresponding to, for example, data received by the microprocessor 24 from various machine monitoring inputs 36 and stored in the internal memory registers of the microprocessor 24 for subsequent transmission. To avoid interference by ambient infrared and optical signals which are typically present, it is desirable to encode the transmitted intelligence on a known carrier frequency. In the preferred embodiment, communications are provided by synchronous signals at 1200 baud encoded on a 30±1 Kilohertz carrier frequency. This encoding is accomplished by the microprocessor 24 in manners well known by those skilled in the art. Of course other forms of encoding may be employed if desired.

If encoding on a carrier frequency, as preferred, is employed, the receiving circuitry may include a demodulator and buffer amplifier 40. In the preferred embodiment, a Motorola demodulator and preamplifier, Part No. MC3373P, is employed and the discriminated output signal is supplied to an interrupt input 42 of the microprocessor 24. Alternatively, the received signal may be supplied to the microprocessor 24 directly which itself may then decode and further discriminate the intelligence as desired in manners known in the art.

The group of switches 26 formed by switches S1-S12 are connected to inputs 27 of the microprocessor 24. A debounce routine run by the microprocessor 24 interrogates the inputs 27 and reduces the likelihood of errors caused by the bouncing of the switch contacts. The routine interrogates the inputs 27 at a particular rate, preferably every 4 ms. If the inputs 27 remain constant for a particular number of interrogations, preferably five, the inputs 27 are recognized and interpreted by a switch accept routine.

Figure 5B:
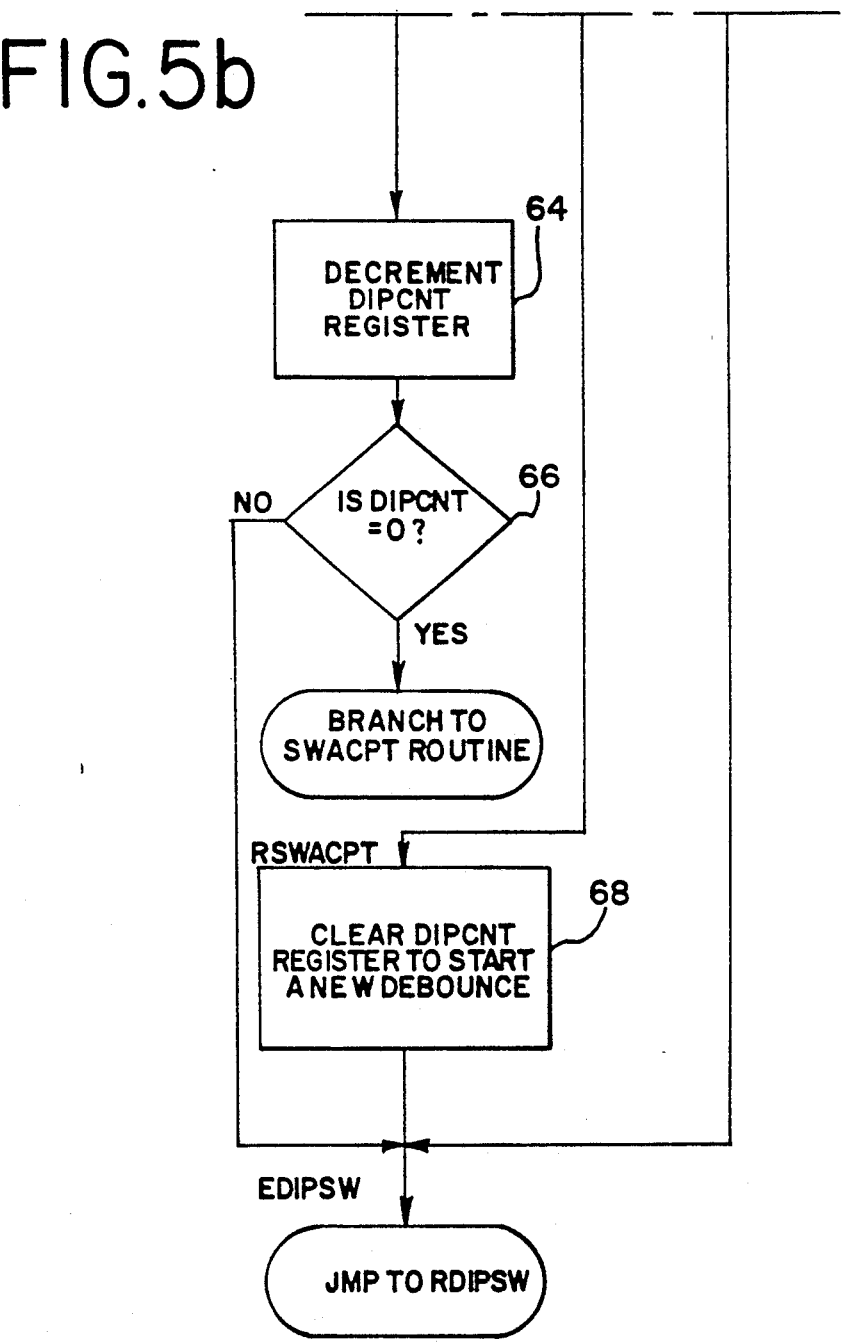

The debounce routine is illustrated by the flow chart of FIG. 5. The blocks of the flow charts illustrated in FIGS. 5, 10, 11 and 12 are representative of both the structure of the present invention and the function of that structure. Although in the preferred embodiments most of the decisional and operational units shown in these flow charts are contained internally in the microprocessor 24 chip, it is equally feasible to construct them of conventional logic integrated circuits, or even with discrete components. Thus, the representation of the boxes in the flow charts of the present invention are both structural and functional and can be interpreted as hardware and/or software. In these figures, rectangles are provided to illustrate operational devices or units which may be flip-flops, solenoids, relays, etc.; and where diamonds are provided to represent decision units which may be comparators, coincidence gates, or the like. Since the physical construction of each operation unit, and each decision unit, is obvious to those skilled in the art from a consideration of its function, the specific construction which may be employed for the various operation units and decision units will not be described in detail. The decision units and operation units shown in the flow charts of the present invention operate in a prescribed sequence, and control the manner in which the various functions are carried out. For that reason, the flow charts will be described in terms of one unit passing control to the next unit, implying that the previous operation or decision has been completed.

The debounce routine illustrated by the flow charts of FIGS. 5a and b is called by a main interrupt routine or the like preferably every 4 ms. A successful debounce is completed when the inputs 27 are interrogated preferably five times and remain constant.

Inputs 27 are split between two input ports of the microprocessor 24, specifically Port A and Port B. Switches S1-S5 and S8, are connected to Port A to provide inputs A5-A0 respectively. Switches S6, S7 and S9-12 are connected to Port B to provide inputs B0-B5 respectively. The debounce routine looks at the inputs from each port separately as will become apparent from the detailed description of FIGS. 5a and b to follow.

An X register is initialized to the value of one at unit 44. The X register determines which port will be interrogated. When X equals zero, Port A will be interrogated and when X equals one, Port B will be interrogated. Control is then passed to unit 46 which determines if the DIPCNT register equals zero. The DIPCNT register equals zero when inputs 27 need to be interrogated for the first time.

Since the inputs are being interrogated for the first time, the DIPCNT register equals zero and control is passed to unit 48 which loads register A with the inputs from Port B, i.e. inputs B0-B5, since the X register equals one. Register A is an eight bit register. Bits 0-5 of register A are then isolated by performing an AND operation as is well known in the art thereby rendering bits 6 and 7 of register A equal to zero. Control is then passed to unit 50 where the contents of register A are stored in register SPADH since register X equals one. In addition, register X is decremented from a value of one to zero. Control is then passed to unit 52 which determines if register X equals zero. Since register X has been decremented to zero, control is returned to unit 48 which now loads register A with inputs from Port A since register X equals zero. As described above bits 0-5 of register A are isolated. Control is then passed to unit 50 which stores the contents of register A in register SPADL since register X equals zero. Register X is again decremented. Control is then passed to unit 52 which determines if register X equals zero. This time register X does not equal zero and thus control is passed to unit 54 which loads register A with the value of four (4) which is then stored in the DIPCNT register.

Four milliseconds later, control is again returned to unit 44 which again initializes the X register to a value of one. Control is then passed to unit 46 which determines if the DIPCNT register has a value of zero. The DIPCNT register now equals 4, as described above, thus control is passed to unit 56 which loads register A with inputs from Port B since register X equals one. As described above bits 0-5 of register A are isolated. Control is passed to unit 58 which compares the contents of register A which contain the current values of inputs from Port B with the contents of register SPADH which contains the initial values of inputs from Port B to determine whether the inputs have remained constant. If the inputs have remained constant, control is passed to unit 60 which decrements the X register so that it now equals zero. Control is then passed to unit 62 which determines whether register X equals zero. Register X now equals zero so control is returned to unit 56 which this time loads register A with inputs from Port A since register X equals zero. Again bits 0-5 are isolated. Control is then passed to unit 58 which compares the contents of register A which contain the current inputs from Port A with the contents of register SPADL which contains the initial values of inputs from Port A. If the inputs have remained constant, control is passed to unit 60 which decrements the X register. Control is then passed to unit 62 which determines if register X equals zero. This time register X does not equal zero so control is passed to unit 64 (FIG. 5b) which decrements the DIPCNT register from a value of 4 to 3. Control is then passed to unit 66 which determines if the DIPCNT register equals zero. The DIPCNT register now equals 3 therefore control is returned to unit 44 four milliseconds later.

Units 56-66 continue to test the current value of the inputs from Ports A and B stored in register A with the inputs initially stored in registers SPADL and SPADH respectively as will be appreciated by those skilled in the art from the description of the debounce routine. If the inputs have remained constant, the DIPCNT register will eventually be decremented to zero thereby passing control to the switch accept routine.

If the inputs from either Port A or B do not remain constant as determined by unit 58 (FIG. 5a), control is passed to unit 68 (FIG. 5b) which clears the DIPCNT register and returns control to unit 44 so that the routine may begin again with the DIPCNT register equal to zero.

The source code for the debounce routine is set out at the end of the detailed description before the claims.

The switch accept routine is called when it has been determined by the debounce routine that the inputs 27 are stable. The switch accept routine recognizes and interprets the inputs 27 from the switches S1-S12. The parameters and their values associated with switches S1-S12 are illustrated in FIGS. 6-9.

With respect to FIGS. 6 through 9, a "0" under a particular switch setting indicates that the switch is in an off/open state and a high signal is transmitted to the input 27 associated with that particular switch because of the pull-up resistor R associated with each switch shown in FIG. 4 and as is well known by those skilled in the art. A "1" indicates the switch is in an on/closed state and a low signal is transmitted to the input 27 associated with that particular switch because that input is pulled to ground. An "X" indicates that the position of that particular switch is not relevant to the particular parameter configuration.

FIG. 6 illustrates the switches associated with the pricing parameter. The pricing parameter, namely the number of coin "1" per cycle or the cycle price in terms of coin "1" is determined by switches S1-S5. For example, if switches S1 and S4 are off and switches S2, S3 and S5 are on, as shown at line 70, the number of coin "1" per cycle is 13. If coin "1" represents a quarter, then each cycle would cost $3.25.

If switches S1-S5 are all in the off position as shown at line 72, the control board is in the default configuration and will function with default values. The default values associated with the pricing parameter is shown at line 74 if the appliance is a washer and line 76 if the appliance is a dryer. If switches S1-S5 are all in the on position as shown at line 78, the control board is operating in free mode. The free mode configuration would be most useful in a non-coin environment, such as for use in a nursing home.

FIG. 7 illustrates the switches associated with the value ratio parameter. Switches S6 and S7 determine the value ratio of coin "2" to coin "1" along with the value of coin "1" and coin "2". This is useful for systems that utilize two coin drop slots. The default value ratio is represented at line 80 as 4. As previously described the default position occurs when switches S1-S5 are all in the off position. The value ratio parameter is stored as Table 2 in the switch accept routine as will be described with respect to FIG. 10.

FIG. 8 illustrates the switch associated with the dryer fixed cycle parameter. Switch S8 determines whether this parameter is activated. This setting is applicable only to dryers to select a fixed cycle option. If a fixed cycle is selected by flipping switch S8 to the on position, only complete cycles can be purchased. The default value position is to not select the dryer fixed cycle as shown at line 82.

FIG. 9 illustrates the switches associated with the dryer cycle time parameter. Switches S9 through S12 define this parameter which is also applicable to dryers only. The various possible combinations of switches S9-S12 select the dryer cycle time in minutes. The default value is set to 35 minutes as shown at line 84.

Figure 10A:
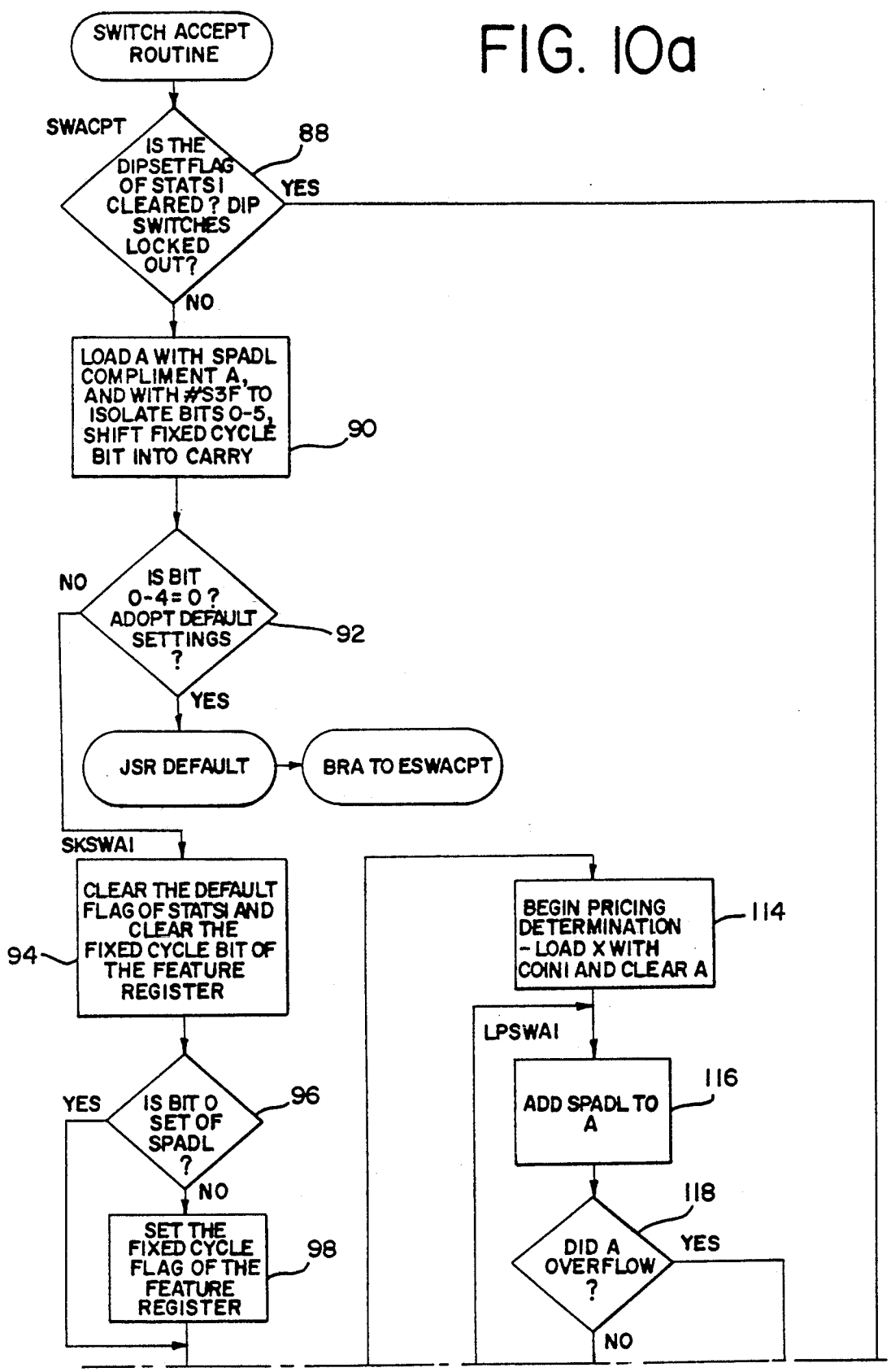
FIGS. 10a and b are flow charts illustrating the switch accept routine.
Figure 10B:
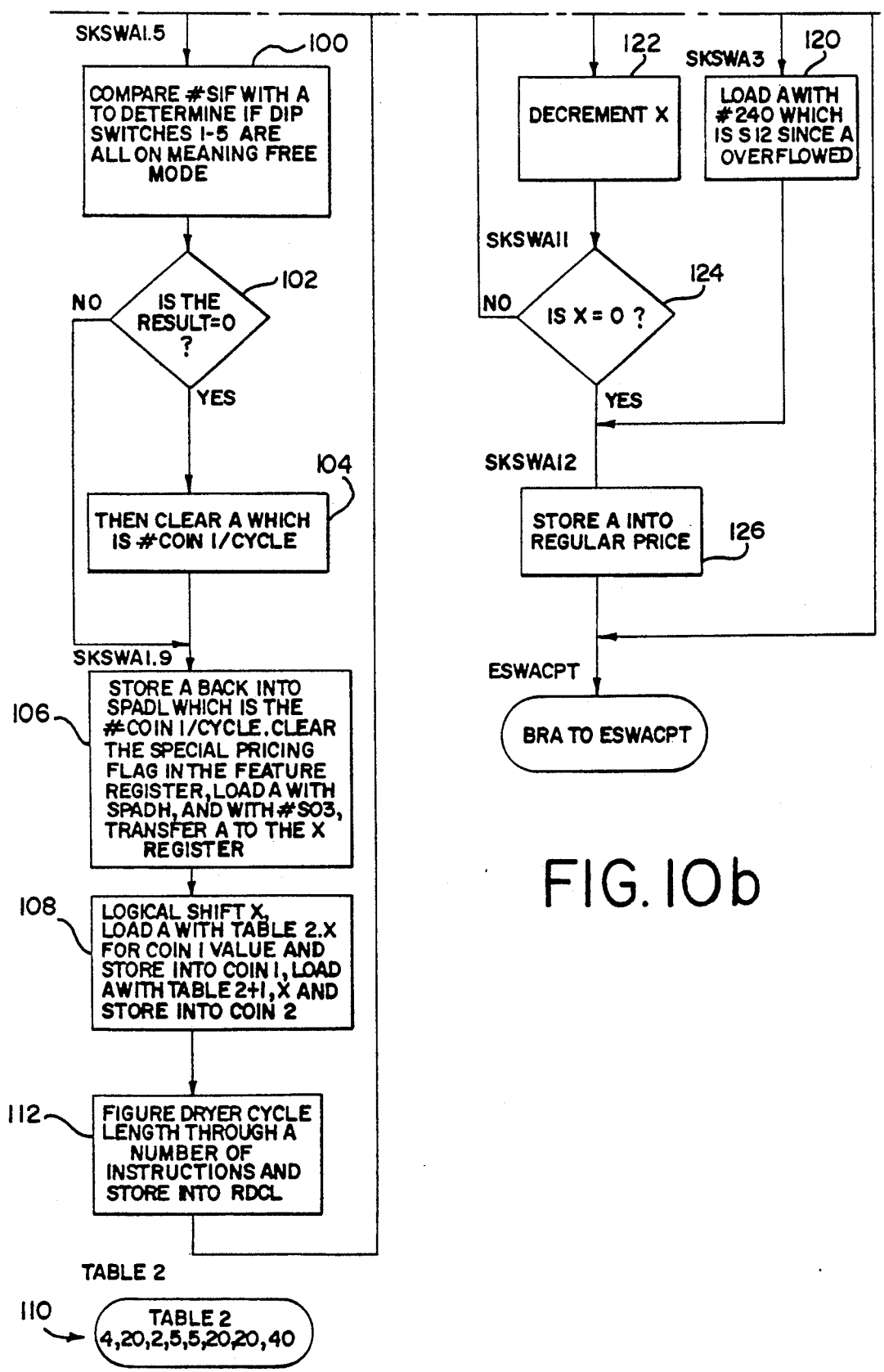

The switch accept routine is illustrated by the flow charts of FIGS. 10a and b. As discussed above, the switch accept routine is called by the debounce routine after it has been determined that inputs 27 are stable. Unit 88 determines whether the DIPSET flag has been cleared. The DIPSET flag is cleared as a result of communication with a hand held probe which will be described in detail with reference to the "lock-out" feature of the present invention. The DIPSET flag can be used to indicate that the appliance is being configured by use of switches S1-S12. If the DIPSET flag has been cleared, control returns to the debounce routine of FIG. 5a. If the DIPSET flag has not been cleared, control is passed to unit 90 which loads register A with the contents of register SPADL which contain inputs from Port A. The inputs are complemented and bits 0-5 of register A are isolated. Bit 0 of register A contains the input from switch S8, which according to FIG. 8, determines whether the fixed cycle option has been selected. Bits 1-5 contain inputs from switches S5-S1 respectively. According to FIG. 6, switches S1-S5 determine the number of coin "1" per cycle. Bit 0, the fixed cycle bit, is shifted into the carry register and bits 1-5 are shifted into bits 0-4 respectively of Register A. Control is then passed to unit 92 which determines whether bits 0-4 of register A are low. Bits 0-4 are low when inputs A1-A5 are high because the inputs were complemented by unit 90. According to FIG. 6, when inputs A1-A5 are high, switches S1-S5 are off and default values are selected as the operational parameters of the appliance. A default routine is thus called and the appliance operates with default values. If bits 0-4 are not low, control is passed to unit 94 where a default flag is cleared and the fixed cycle bit in the Feature register is cleared. Clearing the default flag indicates that the appliance is not operating with default parameters.

Control is then passed to unit 96 where it is determined if bit 0 of the SPADL register is set. As described above, bit 0 of the SPADL register represents input A0 which is controlled by switch S8 (FIG. 4). According to FIG. 8, switch S8 is turned on to select the fixed dryer cycle option. When switch S8 is on, input A0 is low and bit 0 is not set. Thus if bit 0 is not set, control is passed to unit 98 which sets the fixed cycle flag of the Feature register thereby indicating that the fixed dryer cycle option has been selected. If bit 0 is set, control is passed to unit 100 (FIG. 10b) which determines if the free mode of operation has been selected. Register A contains bits 0-4 which represent the complement of inputs from switches S1-S5 which determine the number of coin "1" per cycle. According to FIG. 6, if switches S1-S5 are all on, a free mode of operation is selected. When S1-S5 are all on, inputs A1-A5 are all low but since register A stores the complements of these inputs, bits 0-4 of register A are all high. Control is passed to unit 102 which determines if switches S1-S5 are all on. If switches S1-S5 are all on, control is passed to unit 104 which clears register A thereby zeroing the coin "1" per cycle information. Control is passed to unit 106 which stores the contents of register A in register SPADL. Register SPADL now contains the complements of inputs A1-A5 in bits 0-4. The special pricing flag in the feature register is cleared since the special pricing option is not selectable by use of the dip switches.

Register A is then loaded with the contents of register SPADH. Register SPADH contains inputs from Port B. A logical AND operation is performed with the contents of register A to isolate bits 1 and 2 which represent inputs B0 and B1 from switches S6 and S7 respectively (FIG. 4). The contents of register A are then transferred to register X. Control is then passed to unit 108 which shifts the contents of register X one bit left. Register A is loaded with values from Table 2.

Table 2 (shown as 110) contains eight bytes of information concerning the coin value ratio illustrated in FIG. 7. The zero and first bytes contain information concerning coins 1 and 2 respectively when switches S6 and S7 are both on. The second and third bytes contain information concerning coins 1 and 2 respectively when switch S6 is off and switch S7 is on. The fourth and fifth bytes contain information concerning coins 1 and 2 respectively when switch S6 is on and switch S7 is off. The sixth and seventh bytes contain information concerning coins 1 and 2 respectively when switches S6 and S7 are both off. It can be seen from Table 2 that byte 0=4, byte 1=20, byte 2=2, byte 3=5, byte 4=5, byte 5=20, byte 6=20 and byte 7=40. These bytes represent the number of coins, preferably nickels, for coin 1 and coin 2. Thus byte 5 equals 20 nickels.

Register A is then loaded with a coin 1 value. The contents of register A are then stored in register COIN1. Register A is then loaded with a coin 2 value. The contents of register A are then loaded into register COIN2. The coin 1 and coin 2 values depend upon inputs B0 and B1 which are determined by switches S6 and S7. If both switches are on, inputs B0 and B1 are low. The first bit of register X contains input B0 while the second bit contains input B1. Register X thus has a value of zero. When register X equals zero, the zero byte of Table 2 is selected as coin 1 and the first byte (Table 2+1) of Table 2 is selected as coin 2. If switch S6 is on and switch S7 is off, input B0 is low and input B1 is high, respectively, register X has a value of 4. When register X equals 4, the fourth byte of Table 2 is selected as coin 1 and the fifth byte of Table 2 is selected as coin 2.

Control is then passed to unit 112 which determines the dryer cycle length in minutes. Codes from line A through Line B of the switch accept routine set out at the end of the detailed description describes the code used to determine the dryer cycle length as will be understood by those skilled in the programming art. To simplify the description, the code in effect determines the cycle length by multiplying the value of inputs B2-B5 by five and adding five thereto. As an example, referring to FIG. 9, if switches S9 and S11 are off and switches S10 and S12 are on, inputs B2 and B4 are high while inputs B3 and B5 are low. If switch S12 is the least significant bit and switch S9 is the most significant bit, this combination of switches has a value of 5 which when multiplied by 5 and added to 5 equals a 30 minute cycle length.

Control is then passed to unit 114 (FIG. 10a) which loads register X with the contents of the COIN1 register which will contain one byte from bytes 0, 2, 4 or 6 of Table 2 and clears register A.

Control is then passed to unit 116 where the contents of the SPADL register are added to register A.

SPADL register contains bits 0–4 which now represent the complement of inputs A1-A5 which are determined by switches S1-5 to define the number of coin "1" per cycle. Control is then passed to unit 118 which determines whether register A has overflown. After the contents of Register SPADL are added to the contents of register A, register A contains the complement of inputs A1-A5 after the initial pass through the loop.

If register A has overflown, control is passed to unit 120 (FIG. 10b) which loads register A so that the maximum cost per cycle is set at $12.00. If register A has not overflown, control is passed to unit 122 which decrements register X. As described above, register X defines the value of Coin 1 in nickels. Control is then passed to unit 124 which determines if register X equals zero. If register X does not equal zero, control is returned to unit 116 (FIG. 10a) and register A has the contents of register SPADL added thereto and the loop continues until either register A overflows or register X equals zero. If register X equals zero, control is passed to unit 126 (FIG. 10b) which stores the contents of register A in the Regular Price register.

For example, if register X is loaded with the content of Register COIN1 equal to a value of 5, switch S6 is on and switch S7 is off. When register X equals 5, the fourth byte of Table 2 is selected as coin 1. Unit 114 stores 5 in the X register and clears register A. Unit 116 then stores the contents of register SPADL in register A. As described above, SPADL contains the complement of inputs A1-A5. Inputs A1-A5 define the number of coin 1 per cycle. As an example, referring to FIG. 6, if switches S1-3 are off and switches S4 and S5 are on, inputs A3-A5 are high and inputs A1 and A2 are low. If the fourth bit of register A equals the complement of input A5 and the zero bit equals the complement of input A1, register A would have a value of 3. Register A has not overflown so unit 122 decrements the X register by one, therefore register X now equals 4. Control is returned to unit 116 which adds register SPADL to register A. Register SPADL has a value of 3 and register A now also has a value of 3 as discussed above. Thus register A is increased to 6. The loop continues with register X decreased to 3 and register A increased to 9. Finally register X is decreased to 1 and register A is increased to 15. The value of register A represent the number of nickels per cycle, if coin A is a nickel. In essence, the loop defined by unit 116 through 124 performs a multiplication of the contents of register COIN1 which defines the value of coin 1, and preferably the number of nickels per coin 1 with the contents of register SPADL which defines the number of coin 1 per cycle. The result of the multiplication is the number of nickels per cycle.

The source code for the switch accept routine is set out at the end of the detailed description before the claims.

Output signals are generated in accordance with the selected parameters and these signals are sent to various components of the appliance such as motors and timers, for example, to control the operation of the appliance. For example, referring to FIG. 6, if switches S1-S3 are off and switches S4 and S5 are on, the appliance is configured to require three of coin 1 to be deposited for each cycle. The coin input will be monitored to determine whether three of coin 1 have been deposited. If three of coin 1 have been deposited, then a signal is sent to a relay, for example, which energizes a circuit to start the cycle. If it is determined that three of coin 1 have not been deposited, a signal may be sent to an indicator to tell the user that more coins must be deposited before the cycle will begin. If switch S3 is changed from its off state to an on state, seven of coin 1 are now needed for each cycle. The coin input is monitored to determine whether seven of coin 1 have been deposited and depending upon whether the seven coins have been deposited, a start cycle or a more coins needed signal will be sent.

Those skilled in the art will understand and appreciate that various routines may be employed to operate the appliance according to a selected configuration and therefore no further description is needed.

While the present invention is illustrated as using twelve switches, those skilled in the art will appreciate that the present invention is not limited to twelve switches and the number of switches incorporated varies with the number and range of parameters to be configured. Preferably if the present invention is used in conjunction with a washer, seven switches S1-S7 are dedicated to control the operation of the washer. If the present invention is used in conjunction with a dryer, all twelve switches, S1-S12, are dedicated to control the operation of the dryer.

In addition, while particular switches were illustrated as selecting particular parameters, those skilled in the art will appreciate that this is a matter of design choice and can be altered. It will be understood, of course, that these examples are merely illustrative and are not intended to be exhaustive.

Mechanical configuration of the microprocessor 24 using dip switches S1-S12 is provided for several reasons. First, the appliance may require setup, however, the user may not posses a portable probe or the probe may be malfunctioning. The dip switches allow the appliance to have certain variables setup as described above. Second, the appliance may be sold to a user that does not intend to use a portable probe in association with the appliance. Third, the appliance may be resold to a user that will use the appliance in a noncommercial environment and thus will need to change the pricing parameter to operate in a free mode or have the cycle length of the machine adjusted. Providing configuration by use of switches S1-S12 eliminates the need for an external programming device.

The electro-optical configuration of the microprocessor 24 and the parameters it controls will now be described. A setup mode is selected by the owner or route operator from a menu displayed on the screen 19 of the probe 16 using the key pad 20. (FIG. 3). The optical communications window 18 of the portable probe 16 is aimed at the optical window 14 (FIG. 2) of the appliance and the trigger button 21 is pulled to initiate sending a setup message to the optical detector 32 located behind the optical window 14 of the appliance. The portable probe 16 communicates with the microprocessor 24 via the optical transceiver 28 to set parameters such as pricing and coin value ratios which, as described above, can also be set by switches S1-S12. In addition, parameters such as special pricing, machine identification, location and position code can be set by the probe 16. These parameters are not selectable by use of switches S1-S12. Other parameters such as rinse time, agitate time, number of rinses, just to mention a few, can be provided depending on the needs of the user.

A preferred format of the signals sent by the probe and the appliance will now be described with reference to the preferred embodiment of the present invention. Each message is preferably transmitted serially byte by byte. Each byte comprises 10 bits having one start bit, 8 data bits and one stop bit. The data bits are not specifically coded and there are no restrictions as to data values, therefore any of 256 combinations of 8 data bits may be transmitted as a data byte. Each byte is transmitted least significant bit first, after the start bit and most significant bit last immediately preceding the stop bit at a transmission rate of 1200 Baud as described above. On/off keying of optical signals is used as the modulation scheme with an amplitude modulation depth of 80 to 100%. The subcarrier frequency is 30±1 kHz as described above. The duty cycle of the optical emitter at the subcarrier rate shall range from 40 to 60%. A binary low, i.e. "0", is defined as the presence of optical energy at the optical emitter of the probe or the appliance, i.e. carrier and subcarrier, and a binary high, i.e., "1", is defined as the absence of any transmitted optical energy from the optical emitter of the probe or the appliance.

The data communication between the appliance and the collection probe involves both control messages, data messages, and maintenance messages. The format for a control message is 8 bytes. The message format for a data and maintenance message is an 8 byte preamble plus a variable length data field. The protocol specified is a variation and subset of DDCMP, a byte count protocol for data link control as specified by the Digital Equipment Corporation, (DDCMP, Ver. 4.0; 01 Mar. 1978). Error detection is included for all messages. The error detection employs a cyclic redundancy check using the CRC-16 convention as is well known by those skilled in the art. The CRC-16 algorithm is defined by the equation $p(x) = X^{16} + X^{15} + X^2 + X^0$. [See, W. Stallings, *Data Computer Communications*, pages 105-110 (MacMillian Publishing Co. 1985) incorporated herewith by reference].

There are preferably four types of control messages that are used: Start ("START"); Start Acknowledge ("STACK"); Acknowledge ("ACK"); and No Acknowledge ("NACK"). In the setup mode, a Setup DATA1 and Setup DATA 2 message is used.

As discussed above, each control signal is eight bytes in length. The first byte of each control message is a control message identifier and is used to differentiate control messages from other messages. The second byte defines the message type and is used to distinguish between control messages. The seventh and eighth bytes represent the low and high bytes respectively of CRC16 for the first six bytes of this message.

The optical detector 32 of the appliance (FIG. 4) detects a signal transmitting by the probe 16 and the receiving circuitry 38 delivers a demodulated signal to the interrupt input 42 of the microprocessor 24 as is well known to those skilled in the art. The microprocessor 24 monitors input 42 for signals received by the optical transceiver 28.

Preferably the probe 16 monitors the appliance before transmitting a Setup DATA1 message. When the probe monitors the appliance, the appliance responds by transmitting a collection record containing the current setup and counts of the appliance. This communication protocol provides an opportunity for security checks to be made before the appliance has its setup altered. The security checks may be in the form of matching security or access codes, for example. This portion of the communication protocol is described in detail in copending patent application, incorporated herein by reference, entitled "Data Acquisition System Having Selective Communication" by Scott A. Merkle and Douglas A. Ochsner and assigned to the MAYTAG Corporation U.S. patent application Ser. No. 07/872,062 filed Apr. 22, 1992.

A setup message is then sent by the probe 16. The setup message transmitted by the probe 16 may have numerous fields of information. The setup message has an 8 byte preamble plus a variable number of data bytes. The preamble is used to identify this message as a setup message and should indicate the total number of data bytes in the message. An example of a particular format for the preamble utilizes the first byte as a message identifier which distinguishes this message from other messages. The second byte defines the least significant 8 bits of a 14 bit count defining the total number of data bytes in the message. The least significant 6 bits of the third byte define the most significant 6 bits of the 14 bit count defining total number of data bytes in the message. The fourth through sixth bytes are unused. The seventh and eighth bytes define a cyclic redundancy check, CRC16, for the first 6 bytes of this message.

Immediately following the preamble are the data bytes. The first through the Nth bytes define an appliance setup record. The Nth+1 and the Nth+2 bytes define CRC16 for the N data bytes. An example of data bytes that may be employed in a setup record are shown in Table I below. This is merely illustrative and is not intended to limit the present invention to any particular record format.

TABLE I

| Field Name | Field Length (byte) | Field Position |
|---|---|---|
| Record Type | 1 | 1 |
| Model Code | 1 | 2 |
| Machine ID No. | 3 | 3 |
| Position Code | 1 | 6 |
| Location No. | 3 | 7 |
| Regular Price | 1 | 10 |
| Special Price | 1 | 11 |
| Features | 1 | 12 |
| Special Price Days of Week | 1 | 13 |
| Special Price Begin Time | 1 | 14 |
| Special Price End Time | 1 | 15 |
| Reg. Price Dryer Cycle Length | 1 | 16 |
| Special Price Dryer Cycle Length | 1 | 17 |
| Washer Cycle Length | 1 | 18 |
| Number of Rinses per Cycle | 1 | 19 |
| Minutes of Rinse Agitation | 1 | 20 |
| Value of Coin 1 | 1 | 21 |
| Value of Coin 2 | 1 | 22 |
| Action Code | 1 | 23 |

Each field has a length measured in bytes with each byte having eight bits. Not every field will be described since the field name provides sufficient description as to the contents of the field.

The first five fields provide information about the appliance and its location. Specifically, the first field contains information concerning the record type which is a 1 character binary field that identifies this setup record for a particular machine, for example, different brands of washers would have different values in this field. The second field contains information concerning the model number which is a 1 byte binary field designating the model code of the machine. The third field contains information concerning the machine ID number which is 3 byte field that is determined by the user. It should be unique for each machine in a particular commercial operation. The fourth field contains information concerning the position code which is a 1 byte field designating the position of the machine in the room. The fifth field contains information concerning the location number which is a 3 byte field that is to be determined by the user. It can be used to specify a machine, building address, store, branch area or apartment, for example.

The remaining fields provide information about the operating parameters of the appliance. Specifically, the sixth field contains information concerning regular price which is a 1 byte field that represents the price of a regular cycle preferably in nickels. The seventh field contains information concerning special price which is a 1 byte field that represents the price of a special cycle preferably in nickels. The eighth field contains information concerning features which is a 1 byte field that represents features which may be selected. Bit 0 selects a fixed cycle option while bit 1 selects a special pricing option. The fixed cycle option does not allow the user to buy partial cycles. The special pricing option allows a different price for the machine at certain times of the week. The ninth field contains information concerning the special price days of week which is a 1 byte field representing the days of the week to have special pricing. For example, bits 0-6 may represent the seven days of the week, with Sunday as bit 0. The tenth field contains information concerning the special price begin time which is a 1 byte field representing the starting time of the special price. The eleventh field contains information concerning the special price end time which is a 1 byte field representing the ending time of the special price. The seventeenth field contains information concerning the value of coin 1 which is a 1 byte field representing the value of coin 1. The eighteenth field contains information concerning the value of coin 2 which is a 1 byte field representing the value of coin 2.

The nineteenth field defines an "action code" which is a 1 byte field. Depending upon the value of the action code byte, the appliance will look at and adopt particular fields of the setup record.

Table II below illustrates the action code values, the associated bits which need to be set and the adopted fields. A set bit indicates that a bit is either high or low state, preferably high compared to the other bits.

TABLE II

| Action Code Value | Set Bit | Adopted Field |
|---|---|---|
| 0 | n/a | no action |
| 1 | 0 | set or clear machine id |
| 2 | 1 | set location/position |
| 4 | 2 | set price/coin values |
| 16 | 4 | set cycle length/# of rinses |
| 32 | 5 | clear interval counts |

TABLE II-continued

| Action Code Value | Set Bit | Adopted Field |
|---|---|---|
| 128 | 7 | record already used |

For example, if bit 2 of the action code byte is set, the action code will have a value of four. As shown in Table II, when the action code has a value of four, the values specified in the setup record for regular pricing, special pricing and coin values are selected. If bit 4 of the action code byte is set, the action code will have a value of sixteen. As shown in Table II, when the action code has a value of sixteen the values specified in the record for the remaining setup fields such as cycle lengths, fixed cycles and number of cycles to mention only a few are selected. When either bit 2 or bit 4 of the action code byte is set, the routine "locks out" or ignores inputs from the dip switches S1-S12 which will be described in detail with reference to FIG. 12.

Figure 11A:
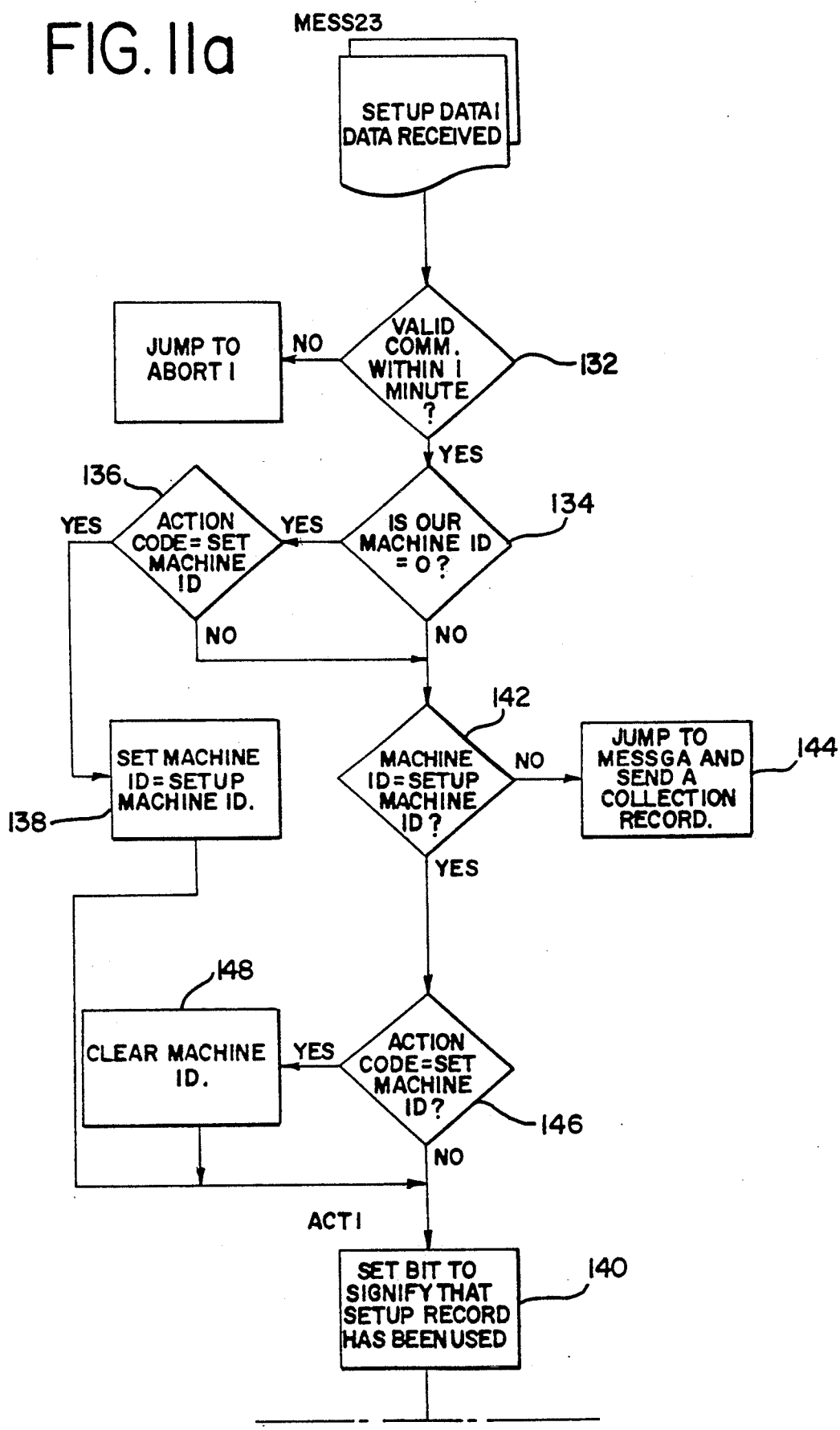

FIGS. 11a and b are charts illustrating a particular setup routine. It is first determined if there is an error in the setup message. If there is an error, a NACK message is transmitted by the appliance to tell the probe that the setup message was not accepted. If the setup message does not have an error, control is passed to unit 132 which determines whether the setup message is sent within one minute of the last valid communication between the probe and the appliance. This is provided because before the probe actually transmits the setup record, it will preferably monitor the appliance as described above. The probe thus receives information concerning the current setup and status of the appliance before sending the setup message. This is included to provide security in that it is determined whether the probe is authorized to setup the appliance. The security can be provided in many ways, for example, a security code can be programmed into each appliance. If this communication did not take place within one minute of transmission of the setup message, an abort routine is called.

Control is then passed to unit 134 which determines whether the appliance identification (id) is equal to zero. If the appliance id is zero, control is passed to unit 136 where it is determined if the action code authorizes the machine id contained in field 3 of the setup record to be adopted. According to Table II, the setup machine id will be adopted if bit 0 of the action code is set. If bit 0 of the action code is set, control is passed to unit 138 and the setup machine id becomes the machine id. Control is then passed to unit 140 which will be described hereinafter.

If bit 0 of the action code is not set or the machine id does not equal zero, control is passed to unit 142 which determines if the machine id equals the setup machine id. If the ids do not match, then control is passed to unit 144 which functions to send a collection record. If the ids match, control is passed to unit 146 which determines if bit 0 of the action code is set. If bit 0 is set, control is passed to unit 148 which clears the machine id. If bit 0 is not set, control is passed to unit 140 which sets bit 7 of the action code (Table II) to signify that the setup record has been used. Control is then passed to unit 150 (FIG. 11b) which determines whether the location and position parameters are to be set. These parameters will be set if bit 1 of the action code is set. If bit 1 of the action code is set, control is passed to unit 152 which sets the location and position parameters according to the setup record. If bit 1 of the action code is not set, control is passed to unit 154 which determines whether the price and coin parameters are to be set. These parameters will be set if bit 2 of the action code is set. If bit 2 of the action code is set, control is passed to unit 156 which sets those parameters accordingly. Otherwise control is passed to unit 158 which determines whether the cycle parameters are to be set. These parameters will be set if bit 4 of the action code is set. If bit 4 of the action code is set, control is passed to unit 160 which sets those parameters accordingly. Otherwise control is passed to unit 162 which determines if bit 5 of the action code has been set. Bit 5 is set if the interval counts accumulated by the appliance are to be cleared. If bit 5 of the action code is set, control is passed to unit 164 which clears the interval counts.

"Lock out" is an important feature of the present invention. When either the second or the fourth bit of the action code has been set as determined by units 154 or 158 respectively of FIG. 11*b*, the DIPSET flag is cleared by units 156 and 160 respectively. Unit 88 of FIG. 10*a* determines whether the DIPSET flag has been cleared. If it has, control is passed to unit 68 of FIG. 5*b* which does not interpret inputs 27. If the DIPSET flag has not been cleared, control is then passed to unit 90 of FIG. 10*a* and the inputs 27 from the dip switches are interpreted as described above.

The source code for the electro-optical configuration routine is set out at the end of the detailed description of above-referenced application, "Data Acquisition System Having Selective Communication Capability" U.S. patent application Ser. No. 07/872,062 filed Apr. 22, 1992.

While a particular setup record and routine were illustrated and described, the present invention can be used in conjunction with other formats of setup records and routines. For example, copending patent application, incorporated herein by reference, entitled, "Data Acquisition System Having Selective Communication Capability" referred to previously, describes a data probe capable of configuring appliances with various setups. Those skilled in the art will appreciate that this is merely a task of programming the microprocessor to properly interpret the signal on its inputs 27 and 42.

The operation of the present invention will now be summarized. When an appliance is "new", meaning it has never communicated with a portable probe 16, switches S1–S5 are all in the off position and the microprocessor is configured with default values. As described above, the configuration of the appliance can be changed by either using the portable probe 16 to optically communicate with the microprocessor 24 or by changing the position of the switches if lock out has not occurred. If the appliance is configured mechanically by the switches S1–S12, the appliance can later be reconfigured either mechanically or electro-optically.

If an appliance has been configured by a portable probe 16 and the appliance identification, location number and position code are the only parameters altered by the probe 16, the appliance can be completely reconfigured by the portable probe 16. Alternately, the dip switches S1–S12 can be used to alter the pricing and cycle lengths parameters because lock out has not occurred. If, however, the pricing or cycle parameters of the appliance were altered by the portable probe 16, and a subsequent configuration change is desired, a probe must be used to reconfigure the appliance because lock out has occurred. Alternately a cold reset can be forced in which case either the switches or the probe can be used. A cold reset occurs when the appliance is powered up after the battery circuit has been disconnected for a period of time long enough to corrupt the memory of the microprocessor 24. The configuration of the appliance defaults to the configuration specified by the position of the dip switches at the time of the cold reset.

While the lock-out feature has been associated with bits 2 or 4 of the action code, those skilled in the art will appreciate that lock-out can be programmed to occur whenever any communication has taken place between the appliance and the data probe.

Electro-optical communication is provided to give greater flexibility to the user. The user can change more parameters while using the portable probe. Also configuring the appliance using a portable probe provides greater security than mechanical configuration using the dip switches. Specifically the switches can be altered by gaining physical access to the control board and changing the switch positions. A configuration created by a portable probe can only be changed by a portable probe having the proper security codes and privileges or by gaining physical access to the control board and forcing a cold reset. In addition, use of a portable probe to setup an appliance is simpler than removing a panel to gain physical access to the dip switches to perform a mechanical configuration. Also the portable probe can provide explicit prompts to guide the user through the configuration operation thus simplifying the process. Also, the configuration can be developed remotely at a central computer and then loaded into the portable probe where the information is then transferred to the appliance by activating a single button of the portable probe.

While the present invention has been described with reference to an appliance and in particular a washer and dryer, those skilled in the art will appreciate that the present invention can be used in conjunction with many other devices which require configuration of the control board to control the operation of the device.

While the invention has been shown and described in connection with particular preferred embodiments, it is apparent that certain changes and modifications, in addition to those mentioned above, may be made by those who are skilled in the art without departing from the basic features of the present invention. Accordingly, it is the intention of the Applicants to protect all variations and modifications within the true spirit and valid scope of the invention.

```
©MAYTAG Company, 1992
*************************************************
*************************************************
* DIPSWITCH ROUTINE BAE LAST MODIFIED:  6/15/91     *
* CALLS:    SWACPT                                  *
* CALLED BY:   TIMINT                               *
* COMMENTS: THE DIPSWITCH ROUTINE IS CALLED ONCE    *
*              EVERY 4ms 5 TIMES IN A ROW TO COMPLETE *
*              A SUCCESSFUL DEBOUNCE.  THEREFORE AN   *
*              ENTIRE DIPSWITCH DEBOUNCE TAKES 16ms.  *
```

```
*           THE DIPSWITCHES ARE DEBOUNCED EVERY       *
*           OTHER 16ms INTERVAL. RECORD MODIFICA-     *
*           TIONS.                                    *
*           3/04/91 -   WORST CASE TIMING FROM START  *
*                       TO FINISH IS 52us.            *
*           06/15/91 -  ELIMINATED USE OF THE FSTTIM  *
*                       FLAG.                         *
*                                                     *
*******************************************************

DIPSW       LDX   #1          N,INITIALIZE X REGISTER
            TST   DIPCNT      IS DIPCNT=0?
            BEQ   LPDIP2      Y,THEN START A NEW DEBOUNCE,LPDIP2
LPDIP1      LDA   0,X         LOAD A WITH PORTA/B
            AND   #$3F        ISOLATE BIT 0-5
            CMP   SPADL,X     HAS THE PORT INPUTS CHANGED?
            BNE   RSWACPT     Y,BRANCH TO SKDIP?
            DEC   X
            BEQ   LPDIP1      IS X=0?Y,BRANCH TO LPDIP1
            DEC   DIPCNT      MUST STAY THE SAME 8 TIMES
            BNE   EDIPSW      IS DIPCNT=0?N,BRANCH TO EDIPSW
            BRA   SWACPT      JUMP TO SWITCH ACCEPT ROUTINE
LPDIP2      LDA   0,X         LOAD A WITH PORTA/B
            AND   #$3F        ISOLATE BIT 0-5
            STA   SPADL,X     SAVE TO SPADL/H
            DEC   X
            BEQ   LPDIP2      IS X=0?Y,BRANCH TO LPDIP2
            LDA   #4          INITIALIZE THE DIPCNT
            STA   DIPCNT
            BRA   EDIPSW
RSWACPT     CLR   DIPCNT      CLEAR THE DIPCNT REGISTER TO START NEW
                              DEBOUNCE
            BCLR  DIPDBN,FLAG3 CLEAR THE DIP DEBOUNCE FLAG TO START
                              INPUTS
EDIPSW      JMP   RDIPSW
***********************END OF DIPSW***********************
***********************************************************
* SWITCH ACCEPT ROUTINE BAE LAST MODIFIED: 2/06/91    *
* CALLS: DEFAULT                                      *
* CALLED BY: DIPSW                                    *
* COMMENTS:   TO SAVE 18 BYTES AT A COST OF 280us DO THE *
*             FOLLOWING: LDX   COIN1                  *
*                        LOOP ADD   RP                *
*           FINAL TESTING DONE ON DEVELOPMENT SYSTEM  *
*           ON 9/28/90. RECORD MODIFICATIONS.         *
*                                                     *
*           2/05/91 - ADDED TEST AT SKSWA11 FOR A CHANGE IN *
*                     REGULAR CYCLE PRICE. IF CYCLE PRICE *
*                     CHANGES THEN DTORP IS CLEARED.  ALSO *
*                     USE SPADL TO TEMPORARILY HOLD THE # OF *
*                     COIN1 PER CYCLE.                *
*           2/05/91 - MOVED MANIPULATION OF FREE FLAG *
*                     HANDLING TO WHERE INITIAL CHECK OF *
*                     FREE PRICING HAPPENS AROUND SKSWA1.5. *
*           2/06/91 - REMOVED FREE FLAG USAGE AND CLEARING *
*                     OF THE LIDTOG FLAG             *
*           3/04/91 - WORST CASE TIMING IF DEFAULT FROM *
*                     START TO FINISH IS 29us.  IF NOT *
*                     ACTIVE THEN 8us. OTHERWISE WORST CASE *
*                     TIMING FROM START TO FINISH IS 274us. *
***********************************************************
* THE DIPSET FLAG IS SET UPON A COLD RESET AND IS ONLY    *
* CLEARED IF A SETUP RECORD IS RECEIVED WITHIN COMMUNICA- *
* TIONS. IF THE DIPSET FLAG IS EVER FOUND TO BE CLEARED   *
* THEN THE DIPSWITCHES ARE NO LONGER INTERPRETED.         *
```

```
SWACPT     BRCLR  DIPSET,STATS1,RSWACPT IS DIPSET FLAG SET?N,RSWACPT
           LDA    SPADL     LOAD A WITH SPADL/PORTA
           COM    A         COMPLEMENT SPADL
           AND    #$3F      ISOLATE BIT 0-5
           LSR    A         SHIFT THE FIXCYC BIT INTO CARRY FLAG
           BNE    SKSWA1    IS BIT 0-4=0?N,BRANCH TO SKSWA1
           JSR    DEFAULT   Y,THEN DEFAULT SETUP IS DICTATED
           BRA    RSWACPT
SKSWA1     BCLR   DEFALT,STATS1 INDICATE NOT DEFAULT SETTINGS
           BCLR   FIXCYC,FEAT INDICATE FIXED CYCLE
           BRSET  0,SPADL,SKSWA1.5 IS FIXCYC POSITION SET?Y,SKSWA1.5
           BSET   FIXCYC,FEAT INDICATE NOT FIXED CYCLE
*                 IF DIP SWITCHES 1-5 ARE ALL SET THEN FREE
*                 MODE IS DESIRED.
SKSWA1.5   CMP    #$1F      ARE DIPS 1-5 ALL ON?
           BNE    SKSWA1.9  N,SKSWA1.9
           CLR    A         Y,THEN CLEAR A WHICH IS #COIN/CYCLE
SKSWA1.9   STA    SPADL     STORE #COIN1/CYCLE INTO SPADL
           BCLR   SPCPRC,FEAT CLEAR SPECIAL PRICING FLAG
           LDA    SPADH
           AND    #$03      ISOLATE THE LOWEST TWO RATIO BITS
           TAX              MOVE INTO X TO USE AS OFFSET
           LSL    X         ISOLATE THE LOWEST TWO RATIO BITS
           LDA    TABLE2,X
           STA    COIN1
           LDA    TABLE2+1,X
           STA    COIN2
Line A→    LDX    SPADH     NOW WORKING ON DRYER CYCLE LENGTH
           COM    X         COMPLEMENT THE ENTIRE REGISTER
           LSR    X         MOVE BITS 2-5 INTO BITS 0-3
           LSR    X
           CLR    A         NEED TO REVERSE ORDER OF BITS
           LSR    X
           ROL    A
           LSR    X
           ROL    A
           LSR    X
           ROL    A
           LSR    X
           ROL    A         DONE WITH REVERSAL OF BITS
           INC    A         TO COMPENSATE FOR 5 MINUTES BEING 0000
           STA    SPADH     NOW CALCULATE DRYER CYCLE LENGTH BY
           LSL    A         MULTIPLY BY 4 AND ADDING SPADH
           LSL    A
           ADD    SPADH
Line B→    STA    RDCL
           LDX    COIN1     LOAD X WITH VALUE OF COIN1
           CLR    A
LPSWA1     ADD    SPADL     ADD THE REGULAR PRICE
           BCS    SKSWA3    DID A OVERFLOW?Y,SKSWA3
           DEC    X         DECREMENT THE LOOP COUNT
           BNE    LPSWA1    IS X=0?N,LPSWA1
           BRA    SKSWA11   BRANCH TO SKSWA11
SKSWA3     LDA    #240      A OVERFLOW SO SET PRICE TO $12.00
SKSWA11    CMP    RP        HAS REGULAR PRICE CHANGED?
           BEQ    SKSWA12   N,SKSWA12
           CLR    DTORP     Y,THEN CLEAR RP TOPOFF REMAINDER
SKSWA12    STA    RP        STORE RESULT INTO RP
ESWACPT    BRA    RSWACPT
TABLE2     FCB    4,20,2,5,5,20,20,40
*********************END OF SWACPT*****************************
```

What is claimed is:

1. A method of programming operating parameters for a machine's mechanical subsystems, the machine having a user interface, comprising the steps of:

providing a programmable controller having a first input, a second input, a third input and an output; the first input communicating with the user interface and the output communicating with the mechanical subsystems of the machine;

providing a first programmer communicating with the second input of the programmable controller, the first programmer capable of generating a first signal when it is activated;

providing a second programmer communicating with the third input of the programmable controller, the second programmer capable of generating a second signal when it is activated;

monitoring the second and third inputs of the programmable controller;

activating one of the first programmer and the second programmer;

detecting an input signal at one of the second and third inputs;

generating operating parameters in response to the detected signal at one of the second or third inputs;

storing the operating parameters in memory;

detecting a signal at the first input from the user interface;

determining whether the signal at the first input satisfies the operating parameters stored in memory;

generating a control signal if the signal at the first input satisfies the operating parameters stored in memory; and sending the control signal to the output of the programmable controller to energize the mechanical subsystems of the machine.

2. A method according to claim 1 further comprising the step of ignoring a signal detected at the second input if a signal has been detected at the third input.

3. A method according to claim 1 wherein the third input is an optical transceiver.

4. A method according to claim 1 wherein the first programmer comprises a plurality of switches located on the machine.

5. A method according to claim 1 wherein the second programmer comprises a hand-held probe.

6. A method according to claim 1 further comprising the steps of changing the operating parameters stored in memory by activating one of the first and second programmer to generate one of a first and second signals.

7. A method according to claim 6 further including the step of ignoring the first signal if a second signal has been received.

8. A system for programming operating parameters of an appliance's mechanical subsystems, the appliance having a user interface for receiving inputs from a user, comprising:

a first programmer generating operating parameter signals;

a second programmer generating operating parameter signals; and a programmable controller having a first input, a second input, a third input and an output; the first input communicating with the user interface, the second input communicating with the first programmer, the third input communicating with the second programmer and the output communicating with the mechanical subsystems, wherein the programmable controller detects an input from one of the first and second programmers and stores the operating parameter signals, the programmable controller determining in response to an input from the user interface whether the input from the user interface satisfies the operating parameter signals programmed in the programmable controller; and if so, generates an output signal to energize the mechanical subsystems.

9. A system according to claim 8 wherein the first programmer comprises a plurality of switches located on the appliance.

10. A system according to claim 9 wherein the second programmer comprises a hand-held probe.

11. A system according to claim 8 wherein the second programmer comprises a hand-held probe.

12. A system according to claim 8 wherein the probe generates electro-optical signals.

13. A system according to claim 8 wherein the programmable controller ignores operating parameter signals at its second input if it has received operating parameter signals at its third input.

14. A system for programming operating parameters of an appliance's mechanical subsystems, the appliance having a user interface for receiving inputs from a user, comprising:

a first programmer generating operating parameter signals;

a second programmer generating operating parameter signals; and a programmable controller having a first input, a second input, a third input and an output; the first input communicating with the user interface, the second input communicating with the first programmer, the third input communicating with the second programmer and the output communicating with the mechanical subsystems, the programmable controller capable of running a routine for detecting an input from one of the first and second programmers, storing the operating parameter signals, determining in response to an input from the user interface whether the input from the user interface satisfies the operating parameter signals programmed in the programmable controller, and if so, generating an output signal to energize the mechanical subsystems.

15. A system according to claim 14 in which the routine that the programmable controller is capable of running is further characterized as a routine that includes:

a lockout subroutine responsive to operating parameter signals generated by the second programmer to cause the programmable controller to ignore operating parameter signals generated by the first programmer.

16. A programmable appliance comprising:

a user interface for receiving inputs from a user;

mechanical subsystems for performing mechanical functions of the appliance;

a programmable controller having a first input, a second input, a third input and an output; the first input communicating with the user interface, the second input receiving first control signals, the third input receiving second control signals and the output communicating with the mechanical subsystems, the programmable controller capable of running a routine for detecting one of the first and second control signals, generating operating parameter signals in response to one of the first and second control signals, determining in response to an input from the user interface whether the input from the user interface satisfies the operating parameter signals generated by the programmable controller, and if so, generating an output signal to energize the mechanical subsystems.

17. An appliance according to claim 16 in which the routine that the programmable controller is capable of running is further characterized as a routine that includes:

a lockout subroutine responsive to the second control signals to cause the programmable controller to ignore the first control signals.

* * * * *